(12) United States Patent
Bottari et al.

(10) Patent No.: US 11,956,015 B2
(45) Date of Patent: Apr. 9, 2024

(54) COMMUNICATION SYSTEM MULTIPLEXING AND DEMULTIPLEXING APPARATUS AND METHODS

(71) Applicant: Telefonaktiebolaget LM Ericsson (publ), Stockholm (SE)

(72) Inventors: Giulio Bottari, Pisa (IT); Luca Giorgi, Pisa (IT); Filippo Ponzini, Pisa (IT)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/276,720

(22) PCT Filed: Sep. 18, 2018

(86) PCT No.: PCT/EP2018/075243
§ 371 (c)(1),
(2) Date: Mar. 16, 2021

(87) PCT Pub. No.: WO2020/057733
PCT Pub. Date: Mar. 26, 2020

(65) Prior Publication Data
US 2022/0038181 A1  Feb. 3, 2022

(51) Int. Cl.
*H04B 10/2575* (2013.01)
*H04B 10/29* (2013.01)
(Continued)

(52) U.S. Cl.
CPC ......... *H04B 10/2575* (2013.01); *H04B 10/29* (2013.01); *H04B 10/614* (2013.01); *H04B 10/6166* (2013.01); *H04B 10/69* (2013.01)

(58) Field of Classification Search
CPC .. H04B 10/2575; H04B 10/29; H04B 10/614; H04B 10/6166; H04B 10/69
See application file for complete search history.

(56) References Cited

U.S. PATENT DOCUMENTS 6,433,906 B1 * 8/2002 Farhan ................. H04B 10/27
398/167.5
9,596,048 B2 * 3/2017 Cho ..................... H04J 14/0267
(Continued)

FOREIGN PATENT DOCUMENTS

WO       2006136811 A1      12/2006
WO   WO-2006136811 A1 *   12/2006   ....... H04B 10/25754
WO       2012072626 A1       6/2012

OTHER PUBLICATIONS

Sabella, Roberto, et al., "Industrial automation enabled by Robotics, Machine Intelligence and 5G", Ericsson Technology Review, 5G and Industrial Automation, Feb. 15, 2018, 1-13.

*Primary Examiner* — Li Liu
(74) *Attorney, Agent, or Firm* — Murphy, Bilak & Homiller, PLLC

(57) ABSTRACT

A communication signal multiplexing apparatus includes first and second optical receivers, with the second optical receiver configured to receive an optical analog radio signal and to convert it into a corresponding electrical analog radio signal having a carrier frequency and the first optical receiver configured to receive an optical digital communication signal and to convert it into a corresponding electrical digital communication signal having a frequency spectrum. Further, a first electrical filter apparatus is configured to receive the electrical digital communication signal, and comprises a low-pass filter having a cut-off frequency lower than the carrier frequency of the electrical analog radio signal, and applies the low-pass filter to the electrical digital communication signal. The apparatus also includes a signal combining apparatus configured to combine the low-pass filtered electrical digital communication signal with the electrical analog radio signal to form a combined electrical signal and an optical transmitter configured to generate an (Continued)

optical communication signal carrying a representation of the combined electrical communication signal.

5 Claims, 13 Drawing Sheets

(51) Int. Cl.
*H04B 10/61* (2013.01)
*H04B 10/69* (2013.01)

(56) References Cited

U.S. PATENT DOCUMENTS

| | | | | |
|---|---|---|---|---|
| 10,284,324 | B2* | 5/2019 | Ponzini | H04L 27/34 |
| 10,505,661 | B2* | 12/2019 | Giorgi | H04J 14/0298 |
| 11,218,222 | B1* | 1/2022 | Perry | H04B 10/572 |
| 2001/0026389 | A1* | 10/2001 | Farhan | H04B 10/0779 398/182 |
| 2002/0003645 | A1* | 1/2002 | Kim | H04B 10/25755 398/115 |
| 2004/0141747 | A1* | 7/2004 | Kenny | H04N 21/6118 398/71 |
| 2006/0067698 | A1* | 3/2006 | Chan | H04B 10/25751 398/141 |
| 2010/0142949 | A1* | 6/2010 | Mysore | H04J 14/0232 398/48 |
| 2010/0150557 | A1* | 6/2010 | Mysore | H04J 14/0252 398/115 |
| 2010/0196010 | A1* | 8/2010 | Miura | H04B 10/29 398/72 |
| 2013/0028610 | A1* | 1/2013 | DeSalvo | H04B 10/25758 398/139 |
| 2013/0170840 | A1* | 7/2013 | Chang | H04B 10/2575 398/115 |
| 2014/0064726 | A1* | 3/2014 | Cucala Garcia | H04B 10/2575 398/45 |
| 2014/0369691 | A1* | 12/2014 | Tanaka | H04B 10/25073 398/89 |
| 2018/0316457 | A1* | 11/2018 | Ponzini | H04J 14/0298 |
| 2019/0036637 | A1* | 1/2019 | Giorgi | H04J 14/0298 |
| 2020/0076469 | A1* | 3/2020 | Ariesen | H04H 20/78 |

* cited by examiner

COMMUNICATION SYSTEM MULTIPLEXING AND DEMULTIPLEXING APPARATUS AND METHODS

TECHNICAL FIELD

The invention relates to communication signal multiplexing apparatus, communication signal demultiplexing apparatus and a communication network node comprising communication signal multiplexing apparatus and communication signal demultiplexing apparatus. The invention further relates to a method of multiplexing communication signals and to a method of demultiplexing communication signals.

BACKGROUND

Mobile communications and the introduction of 3G Partnership Project $5^{th}$ Generation, 5G, and $5^{th}$ Generation New Radio, 5G NR, networks could become significant enablers for Industry 4.0, allowing connectivity and automation on the factory floor on an unprecedented scale, as reported by Sabella et al, "Industrial automation enabled by robotics, machine intelligence and 5G", Ericsson Technology Review, 15 Feb. 2018. However, an end-to-end 5G connectivity solution architecture for industrial applications typically leverages on part of the radio network, the radio core, located in the central office, CO, of a telecom network operator and an indoor radio antenna located in the factory. To preserve the low latency requirements typically required by industrial applications, an optical fiber link must be used to connect the radio antenna at the factory with the radio core at the central office.

The combination of remote control, wireless sensors, and high-capacity communication networks such as 4G and 5G will play a key role in the development of the factory of the future. This combination enables collecting data from shop-floor level in production lines and data transfer to cloud systems for continuous monitoring and control. For the maximum flexibility in a production plant, new kinds of cloud driven robots and a massive number of sensors will be deployed. 5G wireless connectivity, with its standardized networking capabilities, built-in security, guaranteed grades of service and network slicing concepts, is therefore a perfect tool for advanced industries that want to replace or complement complex cabled networks, minimizing the high operational expenditure for upgrading such cabling infrastructures.

Covering a factory plant with a cellular network implies installing an indoor radio antenna inside the factory and connecting the relevant radio unit to a baseband processing system and to a radio core, such as virtual Evolved Packet Core, vEPC. With 5G, it is expected that both the baseband processing system and the radio core will be hosted in the central office of a network operator which typically owns the licensed spectrum in which the indoor radio antenna operates. To meet the strict latency constraints demanded by robotic applications, especially for cloud-based robot control, the factory site and the central office site need to be connected via an optical fiber, which provides the best possible combination of high throughput and low transmission delay. It would be advantageous to exploit an existing fiber to transport the radio traffic, without affecting conventional traffic already conveyed by the fiber, typically Gigabit Ethernet, GbE.

SUMMARY

It is an object to provide an improved communication signal multiplexing apparatus. It is a further object to provide an improved communication signal demultiplexing apparatus. It is a further object to provide an improved communication network node. It is a further object to provide an improved method of multiplexing communication signals. It is a further object to provide an improved method of demultiplexing communication signals.

An aspect of the invention provides communication signal multiplexing apparatus comprising a first optical receiver, a second optical receiver, first electrical filter apparatus, signal combining apparatus and an optical transmitter. The first optical receiver is configured to receive an optical analog radio signal and to convert the optical analog radio signal into a corresponding electrical analog radio signal having a carrier frequency. The second optical receiver is configured to receive an optical digital communication signal and to convert the optical digital communication signal into a corresponding electrical digital communication signal having a frequency spectrum. The first electrical filter apparatus comprises a low-pass filter having a cut-off frequency lower than the carrier frequency of the electrical analog radio signal. The first electrical filter apparatus is configured to receive the electrical digital communication signal and to apply the low-pass filter to the electrical digital communication signal. The signal combining apparatus is configured to combine the low-pass filtered electrical digital communication signal with the electrical analog radio signal to form a combined electrical communication signal. The optical transmitter is configured to generate an optical communication signal carrying a representation of the combined electrical communication signal.

The multiplexing apparatus advantageously shapes, by low-pass filtering, an electrical digital communication signal to allow frequencies higher than the low-pass filter cut-off frequency to be available to host an analog radio signal. Advantageously, the same optical fibre can be used for simultaneous optical transmission of analog radio signals having a carrier frequency higher than the low-pass filter cut-off frequency and digital communication signals that have been filtered by the low-pass filter, without the analog radio signals affecting the digital communication signals. An existing fibre can therefore be used for radio transport purposes, even if already occupied by digital communication signals, so existing digital communication infrastructure does not need to be changed or adjusted.

In an embodiment, the first electrical filter apparatus comprises a filter cascade comprising a first low-pass filter, a second low-pass filter and a switch. The first low-pass filter has a first cut-off frequency and the second low-pass filter has a second cut-off frequency lower than the first cut-off frequency. The switch has a first state in which an output of the first low-pass filter by-passes the second low-pass filter and a second state in which the output of the first low-pass filter is coupled to an input of the second low-pass filter. The switch is configurable to be set to the first state when a first lobe of the frequency spectrum of the electrical digital communication signal is lower than the first cut-off frequency and is configurable to be set to the second state when the first lobe of the frequency spectrum of the electrical digital communication signal is lower than the second cut-off frequency. The filter cascade advantageously enables multiplexing different frequency combinations of analog radio signal and digital communication signal.

In an embodiment, the switch is configured to receive a first control signal comprising instructions to cause the switch to be set to the first state or the second state. The filter cascade switch may enable the communication signal multiplexing apparatus to be deployed as a "plug-and-play"

apparatus, configurable in the field depending on the communication signals to be multiplexed.

In an embodiment, the switch is configured to receive said first control signal from a control layer of a communication network. The switch may therefore be controlled centrally.

In an embodiment, the communication signal multiplexing apparatus further comprises sensing apparatus configured to: receive a replica of the optical digital communication signal; convert the replica of the optical digital communication signal into a corresponding electrical digital communication signal having a frequency spectrum; determine the frequency range occupied by the frequency spectrum; and generate said first control signal. The first control signal is configured to cause the switch to be set to the first state or the second state depending on the frequency range occupied by the frequency spectrum. The switch is configurable to be set to the first state or the second state depending on the first control signal. The sensing apparatus advantageously enables the switch to be configured responsive to the actual digital communication signal to be multiplexed.

In an embodiment, the sensing apparatus is further configured to generate a radio control signal comprising an indication of the frequency range occupied by the electrical digital communication signal. The radio control signal may advantageously be provided to an analog radio signal control apparatus of a communication network, so that the carrier frequency of the electrical analog radio signal can be set depending on the frequency range occupied by the digital communication signal.

In an embodiment, the analog radio signal is a $3^{rd}$ Generation Partnership Project, 3GPP, communication signal having a carrier frequency of at least 1 GHz and the digital communication signal is a Gigabit Ethernet, GbE, communication signal. The multiplexing apparatus advantageously shapes, by low-pass filtering, an Ethernet signal to allow frequencies higher than 1 GHz to be available to host 3GPP communication signals, such as Mid and High band 5G and 5G NR communication signals.

In an embodiment, the analog radio signal is one of a 3GPP $5^{th}$ Generation, 5G, communication signal and a 3GPP $5^{th}$ Generation New Radio, 5G NR, communication signal. The communication signal multiplexing apparatus may advantageously speed up deployment of a 5G network, since existing fibre can be used for 5G radio transport purposes, even if already occupied by serving Ethernet, and existing Ethernet infrastructure does not need to be changed or adjusted.

In an embodiment, the digital communication signal is one of a 1 GbE communication signal and a 10 GbE communication signal.

In an embodiment, the first electrical filter apparatus is configured to apply a low-pass filter having cut-off frequency of at least 9 GHz when the digital communication signal is a 10 GbE communication signal. The first electrical filter apparatus is configured to apply a low-pass filter having cut-off frequency of 1 GHz when the digital communication signal is a 1 GbE communication signal. The first electrical filter apparatus advantageously enables multiplexing different combinations of Ethernet and 5 G radio signals.

In an embodiment, the signal combining apparatus comprises an electrical power coupler.

Corresponding embodiments apply equally to the communication signal demultiplexing apparatus, the communication network node and the methods described below.

An aspect of the invention provides communication signal demultiplexing apparatus comprising an optical receiver, signal splitting apparatus, second electrical filter apparatus, a first optical transmitter and a second optical transmitter. The optical receiver is configured to receive an optical communication signal carrying a representation of a combined electrical communication signal. The optical receiver is further configured to convert the optical communication signal into the combined electrical communication signal. The combined electrical communication signal comprises an electrical digital communication signal having a frequency spectrum and an electrical analog radio signal having a carrier frequency. The signal splitting apparatus is configured to power split the combined electrical communication signal into first and second parts. The second electrical filter apparatus comprises a low-pass filter having a cut-off frequency lower than the carrier frequency of the electrical analog radio signal. The second electrical filter apparatus is configured to receive a first part of the combined electrical communication signal and to apply the low-pass filter to the combined electrical communication signal to obtain the electrical digital communication signal. The first optical transmitter is configured to convert the electrical digital communication signal into a corresponding optical digital communication signal. The second optical transmitter is configured to receive a second part of the combined electrical communication signal and to convert said second part into a corresponding optical communication signal.

The demultiplexing apparatus advantageously low-pass filters the electrical digital communication signal to remove frequencies higher than the low-pass filter cut-off frequency, including the electrical analog radio signals transmitted as the optical analog radio signal simultaneously with optical digital communication signal. Advantageously, the same optical fibre can be used for simultaneous optical transmission of analog radio signals having a carrier frequency higher than the low-pass filter cut-off frequency and digital communication signals that have been filtered by the low-pass filter, without the analog radio signals affecting the digital communication signals. An existing fibre can therefore be used for radio transport purposes, even if already occupied by digital communication signals, so existing digital communication infrastructure does not need to be changed or adjusted.

In an embodiment, the second electrical filter apparatus comprises a filter cascade comprising a first low-pass filter, a second low-pass filter and a switch. The first low-pass filter has a first cut-off frequency and the second low-pass filter has a second cut-off frequency lower than the first cut-off frequency. The switch has a first state in which an output of the first low-pass filter by-passes the second low-pass filter and a second state in which the output of the first low-pass filter is coupled to an input of the second low-pass filter. The switch is configurable to be set to the first state when a first lobe of the frequency spectrum of the electrical digital communication signal is lower than the first cut-off frequency and is configurable to be set to the second state when the first lobe of the frequency spectrum of the electrical digital communication signal is lower than the second cut-off frequency. The filter cascade advantageously enables demultiplexing different frequency combinations of analog radio signal and digital communication signal.

In an embodiment, the communication signal demultiplexing apparatus further comprises third electrical filter apparatus comprising a high-pass filter having a cut-off frequency lower than the carrier frequency of the electrical analog radio signal. The third electrical filter apparatus is configured to receive said second part of the combined electrical digital communication signal and is configured to apply the high-pass filter to said second part of the combined electrical digital communication signal to obtain the electrical analog radio signal. The second optical transmitter is configured to receive the electrical analog radio signal and to convert the electrical analog radio signal into a corresponding optical analog radio signal. The high pass filter advantageously removes the electrical digital communication signal and mitigates possible interference between the electrical analog radio signal and the electrical digital communication signal in the second optical transmitter.

In an embodiment, the third electrical filter apparatus comprises a filter cascade comprising a first high-pass filter, a second high-pass filter and a switch. The first high-pass filter has a first cut-off frequency and the second high-pass filter has a second cut-off frequency higher than the first cut-off frequency. The switch has a first state in which an output of the first high-pass filter by-passes the second high-pass filter and a second state in which the output of the first high-pass filter is coupled to an input of the second high-pass filter. The switch is configurable to be set to the first state when the electrical digital communication signal frequency spectrum occupies a frequency range lower than the first cut-off frequency. The switch is configurable to be set to the second state when the electrical digital communication signal frequency spectrum occupies a frequency range higher than the first cut-off frequency and lower than the second cut-off frequency. The filter cascade advantageously enables demultiplexing different frequency combinations of analog radio signal and digital communication signal.

In an embodiment, the signal splitting apparatus comprises an electrical power divider.

An aspect of the invention provides a communication network node comprising communication signal multiplexing apparatus and communication signal demultiplexing apparatus. The communication signal multiplexing apparatus comprises a first optical receiver, a second optical receiver, first electrical filter apparatus, signal combining apparatus and an optical transmitter. The first optical receiver is configured to receive an optical analog radio signal and to convert the optical analog radio signal into a corresponding electrical analog radio signal having a carrier frequency. The second optical receiver is configured to receive an optical digital communication signal and to convert the optical digital communication signal into a corresponding electrical digital communication signal having a frequency spectrum. The first electrical filter apparatus comprises a low-pass filter having a cut-off frequency lower than the carrier frequency of the electrical analog radio signal. The first electrical filter apparatus is configured to receive the electrical digital communication signal and to apply the low-pass filter to the electrical digital communication signal. The signal combining apparatus is configured to combine the low-pass filtered electrical digital communication signal with the electrical analog radio signal to form a combined electrical signal. The optical transmitter is configured to generate an optical communication signal carrying a representation of the combined electrical communication signal. The communication signal demultiplexing apparatus comprises an optical receiver, signal splitting apparatus, second electrical filter apparatus, a first optical transmitter and a second optical transmitter. The optical receiver is configured to receive an optical communication signal carrying a representation of a combined electrical communication signal. The optical receiver is further configured to convert the optical communication signal into the combined electrical communication signal. The combined electrical communication signal comprises an electrical digital communication signal having a frequency spectrum and an electrical analog radio signal having a carrier frequency. The signal splitting apparatus is configured to power split the combined electrical communication signal into first and second parts. The second electrical filter apparatus comprises a low-pass filter having a cut-off frequency lower than the carrier frequency of the electrical analog radio signal. The second electrical filter apparatus is configured to receive a first part of the combined electrical communication signal and to apply the low-pass filter to the combined electrical communication signal to obtain the electrical digital communication signal. The first optical transmitter is configured to convert the electrical digital communication signal into a corresponding optical digital communication signal. The second optical transmitter is configured to receive a second part of the combined electrical communication signal and to convert said second part into a corresponding optical communication signal.

The optical communication node advantageously enables the same optical fibre to be used for simultaneous optical transmission of analog radio signals and digital communication signals, without the analog radio signals affecting the digital communication signals. An existing fibre can therefore be used for radio transport purposes, even if already occupied by digital communication signals, so existing digital communication infrastructure does not need to be changed or adjusted.

In an embodiment, the communication signal multiplexing apparatus further comprises sensing apparatus configured to: receive a replica of the optical digital communication signal; convert the replica of the optical digital communication signal into a corresponding electrical digital communication signal having a frequency spectrum; determine the frequency range occupied by the frequency spectrum; and generate a first control signal. The first control signal is configured to cause the switch of the first electrical filter apparatus to be set to the first state or the second state depending on the frequency range occupied by the frequency spectrum. The sensing apparatus advantageously enables the switch to be configured responsive to the actual digital communication signal to be multiplexed.

In an embodiment, the communication signal demultiplexing apparatus further comprises third electrical filter apparatus comprising a high-pass filter having a cut-off frequency lower than the carrier frequency of the electrical analog radio signal. The third electrical filter apparatus is configured to receive said second part of the combined electrical digital communication signal and is configured to apply the high-pass filter to said second part of the combined electrical digital communication signal to obtain the electrical analog radio signal. The second optical transmitter is configured to receive the electrical analog radio signal and to convert the electrical analog radio signal into a corresponding optical analog radio signal. The high pass filter advantageously removes the electrical digital communication signal and mitigates possible interference between the electrical analog radio signal and the electrical digital communication signal in the second optical transmitter.

In an embodiment, the third electrical filter apparatus comprises a filter cascade comprising a first high-pass filter, a second high-pass filter and a switch. The first high-pass filter has a first cut-off frequency and the second high-pass filter has a second cut-off frequency higher than the first cut-off frequency. The switch has a first state in which an output of the first high-pass filter by-passes the second high-pass filter and a second state in which the output of the first high-pass filter is coupled to an input of the second high-pass filter. The switch is configurable to be set to the first state when the electrical digital communication signal frequency spectrum occupies a frequency range lower than the first cut-off frequency. The switch is configurable to be set to the second state when the electrical digital communication signal frequency spectrum occupies a frequency range higher than the first cut-off frequency and lower than the second cut-off frequency. The filter cascade advantageously enables demultiplexing different frequency combinations of analog radio signal and digital communication signal.

In an embodiment, the sensing apparatus is further configured to generate a second control signal configured to cause the switch of the second electrical filter apparatus to be set to the first state or the second state depending on the frequency range occupied by the electrical digital communication signal frequency spectrum. The sensing apparatus is further configured to generate a third control signal configured to cause the switch of the third electrical filter apparatus to be set to the first state or the second state depending on the frequency range occupied by the electrical digital communication signal frequency spectrum. The sensing apparatus may enable the communication network node to be deployed as a "plug-and-play" device, configurable in the field depending on the communication signals with which it is to be used.

An aspect of the invention provides method of multiplexing communication signals. The method comprises a step of receiving an optical analog radio signal and converting the optical analog radio signal into a corresponding electrical analog radio signal having a carrier frequency. The method further comprises a step of receiving an optical digital communication signal and converting the optical digital communication signal into a corresponding electrical digital communication signal having a frequency spectrum. The method further comprises a step of low-pass filtering the electrical digital communication signal with a low-pass filter having a cut-off frequency lower than the carrier frequency of the electrical analog radio signal. The method further comprises a step of combining the low-pass filtered electrical digital communication signal with the electrical analog radio signal to form a combined electrical signal. The method further comprises a step of generating an optical communication signal carrying a representation of the combined electrical communication signal.

The method advantageously shapes, by low-pass filtering, an electrical digital communication signal to allow frequencies higher than the low-pass filter cut-off frequency to be available to host an analog radio signal. Advantageously, the method enables the same optical fibre to be used for simultaneous optical transmission of analog radio signals having a carrier frequency higher than the low-pass filter cut-off frequency and digital communication signals that have been filtered by the low-pass filter, without the analog radio signals affecting the digital communication signals. An existing fibre can therefore be used for radio transport purposes, even if already occupied by digital communication signals, so existing digital communication infrastructure does not need to be changed or adjusted.

In an embodiment, the electrical digital communication signal is low-pass filtered with a first low-pass filter having a first cut-off frequency or with the first low-pass filter followed by a second low-pass filter having a second cut-off frequency lower than the first cut-off frequency. The first low-pass filter is used when a first lobe of the frequency spectrum of the electrical digital communication signal is lower than the first cut-off frequency and the combination of the first low-pass filter followed by the second low-pass filter is used the first lobe of the frequency spectrum of the electrical digital communication signal is lower than the second cut-off frequency. This advantageously enables multiplexing different frequency combinations of analog radio signal and digital communication signal.

In an embodiment, the analog radio signal is a $3^{rd}$ Generation Partnership Project, 3GPP, communication signal having a carrier frequency of at least 1 GHz and the digital communication signal is a Gigabit Ethernet, GbE, communication signal. The method may advantageously shape, by low-pass filtering, an Ethernet signal to allow frequencies higher than 1 GHz to be available to host 3GPP communication signals, such as Mid and High band 5G and 5G NR communication signals.

In an embodiment, the analog radio signal is one of a 3GPP $5^{th}$ Generation, 5G, communication signal and a 3GPP $5^{th}$ Generation New Radio, 5G NR, communication signal. The method may advantageously speed up deployment of a 5G network, since existing fibre can be used for 5G radio transport purposes, even if already occupied by serving Ethernet, and existing Ethernet infrastructure does not need to be changed or adjusted.

In an embodiment, the digital communication signal is one of a 1 GbE communication signal and a 10 GbE communication signal. The step of low-pass filtering comprises low-pass filtering the electrical digital communication signal with a low-pass filter having cut-off frequency of at least 9 GHz when the digital communication signal is a 10 GbE communication signal. The step of low-pass filtering comprises low-pass filtering the electrical digital communication signal with a low-pass filter having cut-off frequency of 1 GHz when the digital communication signal is a 1 GbE communication signal. This may advantageously enable multiplexing different combinations of Ethernet and 5G radio signals.

An aspect of the invention provides a method of demultiplexing communication signals. The method comprises a step of receiving an optical communication signal carrying a representation of a combined electrical communication signal and converting the optical communication signal into the combined electrical communication signal. The combined electrical communication signal comprises an electrical digital communication signal having a frequency spectrum and an electrical analog radio signal having a carrier frequency. The method further comprises a step of power splitting the combined electrical communication signal into first and second parts. The method further comprises a step of low-pass filtering said first part of the electrical digital communication signal with a low-pass filter having a cut-off frequency lower than the carrier frequency of the electrical analog radio signal, to obtain the electrical digital communication signal. The method further comprises a step of converting the electrical digital communication signal into a corresponding optical digital communication signal. The method further comprises a step of converting said second part into a corresponding optical communication signal.

The method advantageously low-pass filters the electrical digital communication signal to remove frequencies higher than the low-pass filter cut-off frequency, including the electrical analog radio signals transmitted as the optical analog radio signal simultaneously with optical digital communication signal. Advantageously, the method may enable the same optical fibre to be used for simultaneous optical transmission of analog radio signals having a carrier frequency higher than the low-pass filter cut-off frequency and digital communication signals that have been filtered by the low-pass filter, without the analog radio signals affecting the digital communication signals. An existing fibre can therefore be used for radio transport purposes, even if already occupied by digital communication signals, so existing digital communication infrastructure does not need to be changed or adjusted.

In an embodiment, the method further comprises a step of high-pass filtering said second part of the electrical digital communication signal with a high-pass filter having a cut-off frequency lower than the carrier frequency of the electrical analog radio signal, to obtain the electrical analog radio signal. The method further comprises a step of converting the electrical analog radio signal into a corresponding optical analog radio signal. This may advantageously remove the electrical digital communication signal and mitigate possible interference between the electrical analog radio signal and the electrical digital communication signal during optical conversion.

An aspect of the invention provides a computer program comprising instructions which, when executed on at least one processor, cause the at least one processor to carry out any of the above steps of the method of multiplexing communication signals.

An aspect of the invention provides a computer program comprising instructions which, when executed on at least one processor, cause the at least one processor to carry out any of the above steps of the method of demultiplexing communication signals.

An aspect of the invention provides a carrier containing a computer program comprising instructions which, when executed on at least one processor, cause the at least one processor to carry out any of the above steps of the method of multiplexing communication signals. The carrier is one of an electronic signal, optical signal, radio signal, or computer readable storage medium.

An aspect of the invention provides a carrier containing a computer program comprising instructions which, when executed on at least one processor, cause the at least one processor to carry out any of the above steps of the method of demultiplexing communication signals. The carrier is one of an electronic signal, optical signal, radio signal, or computer readable storage medium.

Embodiments of the invention will now be described, by way of example only, with reference to the accompanying drawings.

DETAILED DESCRIPTION

The same reference numbers will used for corresponding features in different embodiments.

Figure 1:
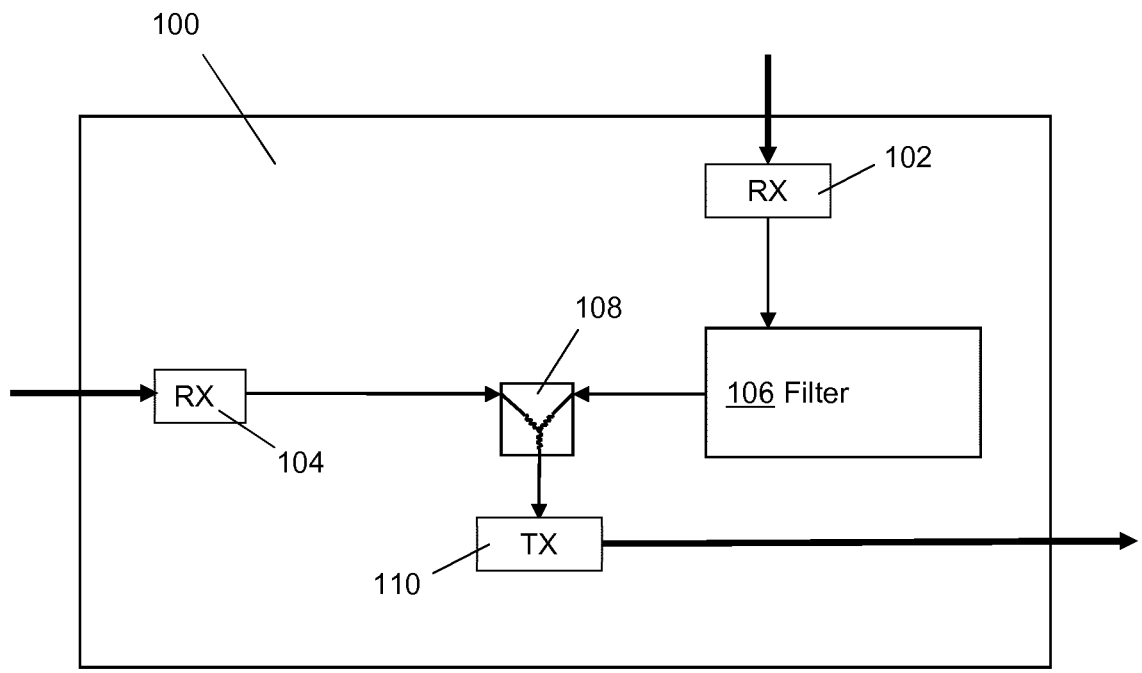
FIGS. 1 to 3 are schematic representations of communication signal multiplexing apparatus according to embodiments of the invention.

An embodiment of the invention provides communication signal multiplexing apparatus 100, as illustrated in FIG. 1. The apparatus 100 comprises a first optical receiver 102, a second optical receiver 104, first electrical filter apparatus 106, signal combining apparatus 108 and an optical transmitter 110.

The second optical receiver 104 is configured to receive an optical analog radio signal and to convert the optical analog radio signal into a corresponding electrical analog radio signal having a carrier frequency. The first optical receiver 102 is configured to receive an optical digital communication signal and to convert the optical digital communication signal into a corresponding electrical digital communication signal having a frequency spectrum.

The first electrical filter apparatus 106 comprises a low-pass filter having a cut-off frequency lower than the carrier frequency of the electrical analog radio signal. The low-pass filter cut-off frequency is the 3 dB cut-off frequency. The first electrical filter apparatus is configured to receive the electrical digital communication signal and to apply the low-pass filter to the electrical digital communication signal. By low-pass filtering the electrical digital communication signal, frequencies higher than the cut-off frequency are removed so that these frequencies are available to be occupied by the analog radio signal.

The signal combining apparatus 108 is configured to combine the low-pass filtered electrical digital communication signal with the electrical analog radio signal to form a combined electrical signal. In this embodiment, the signal combining apparatus is an electrical power coupler.

The optical transmitter 110 is configured to generate an optical communication signal carrying a representation of the combined electrical communication signal. The low-pass filtering reshapes the frequency spectrum of the electrical digital communication signal, which enables simultaneous optical transmission of the analog radio signal and the filtered digital communication signal without the analog radio signal affecting the digital communication signal. As discussed further below, low-pass filtering of the digital communication signal can be achieved without affecting the digital communication signal performance.

Figure 2:
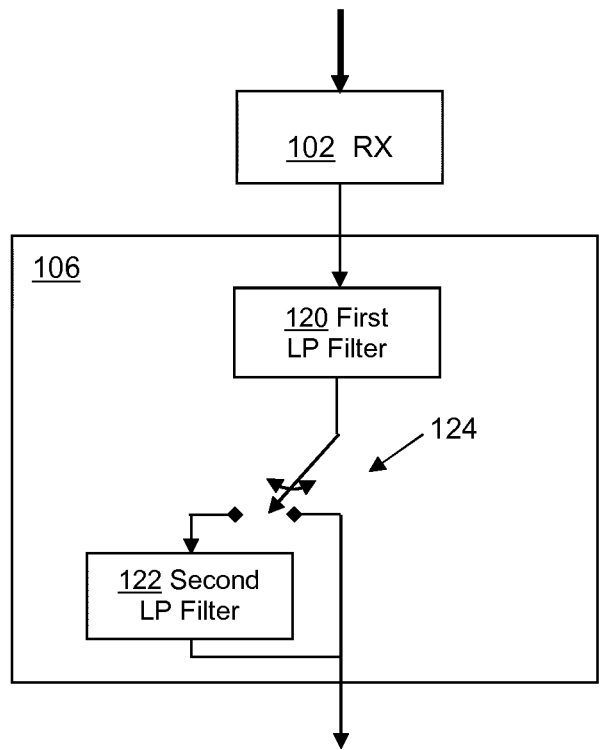

FIG. 2 illustrates part of a communication signal multiplexing apparatus according to the present invention; the rest of the communication signal multiplexing apparatus is the same as shown in FIG. 1. In one embodiment, the first electrical filter apparatus 106 comprises a filter cascade comprising a first low-pass filter 120, a second low-pass filter 122 and a switch 124.

The first low-pass filter has a first cut-off frequency, and the second low-pass filter has a second cut-off frequency, lower than the first cut-off frequency. The switch has a first state in which an output of the first low-pass filter 120 by-passes the second low-pass filter 122 and a second state in which the output of the first low-pass filter is coupled to an input of the second low-pass filter. The switch is configurable to be set to the first state when a first lobe of the frequency spectrum of the electrical digital communication signal is lower than the first cut-off frequency and is configurable to be set to the second state when the first lobe of the frequency spectrum of the electrical digital communication signal is lower than the second cut-off frequency.

In another embodiment, the analog radio signal is a 3GPP communication signal having a carrier frequency of at least 1 GHz and the digital communication signal is a Gigabit Ethernet, GbE, communication signal. In this embodiment, the digital communication signal can be a 1 GbE signal or a 10 GbE signal. The first low-pass filter 120 has a 3 dB cut-off frequency of at least 9 GHz, for example 9 GHz or 10 GHz, and the second low-pass filter has a 3 dB cut-off frequency of 1 GHz. The switch 124 is configurable to be set to the first state when the digital communication signal is a 10 GbE signal and to be set to the second state when the digital communication signal is a 1 GbE signal. With the switch 124 set in the first state, frequencies higher than the first low-pass filter cut-off frequency, for example 9 GHz or 10 GHz, are available for analog radio signal transmission, so for example a 5G 3GPP radio signal in the high bands may be transmitted alongside a 10 GbE signal. With the switch 124 set in the second state, frequencies higher than the second low-pass filter cut-off frequency, 1 GHz, are available for analog radio signal transmission, so for example a 5G 3GPP radio signal in the mid or high bands may be transmitted alongside a 1 GbE signal.

Figure 3:
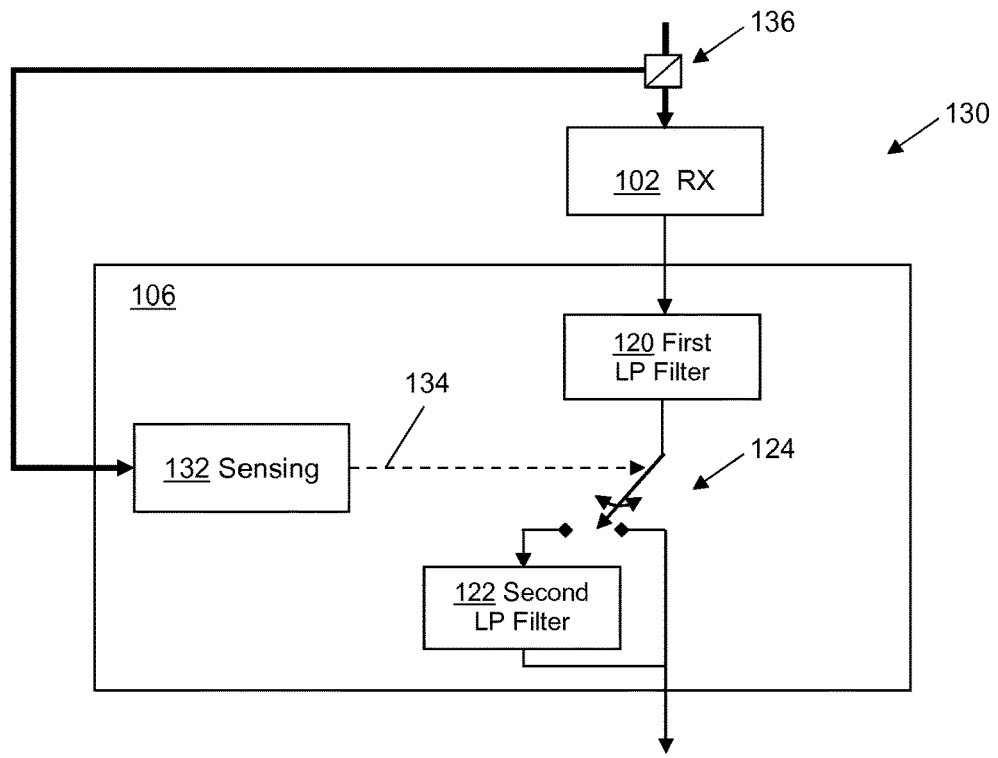

FIG. 3 illustrates part of a communication signal multiplexing apparatus according to an embodiment of the invention; the rest of the communication signal multiplexing apparatus is the same as shown in FIGS. 1 and 2.

The communication signal multiplexing apparatus of this embodiment additionally comprises sensing apparatus 132 configured to receive a replica of the optical digital communication signal, formed by an optical splitter 136 configured to receive and power split the optical digital communication signal. The optical splitter 136 may power split the optical digital communication signal unevenly, for example 90:10, so that the replica directed to the sensing apparatus 132 has a lower optical power than the remaining part of the optical digital communication signal transmitted to the first optical receiver 102.

The sensing apparatus is configured to convert the replica optical digital communication signal into a corresponding electrical digital communication signal having a frequency spectrum. The sensing apparatus is also configured to determine the frequency range occupied by the frequency spectrum of the electrical digital communication signal. In terms of the previous embodiment, the sensing apparatus determines whether the digital communication signal is a 1 GbE signal or a 10 GbE signal.

The sensing apparatus is also configured generate a first control signal 134 configured to cause the switch to be set to the first state or the second state depending on the frequency range occupied by the frequency spectrum of the digital communication signal. In terms of the previous embodiment, the control signal is configured to cause the switch to be set to the first state for a 10 GbE signal and to cause the switch to be set to the second state for a 1 GbE signal.

The switch 124 is therefore configurable to be set to the first state or the second state based on the output of the sensing apparatus.

In an alternative embodiment, the switch 124 is configured to receive the first control signal from a control layer of a communication network.

In an embodiment, the sensing apparatus 132 is further configured to generate a radio control signal comprising an indication of the frequency range occupied by the electrical digital communication signal.

Figure 4:
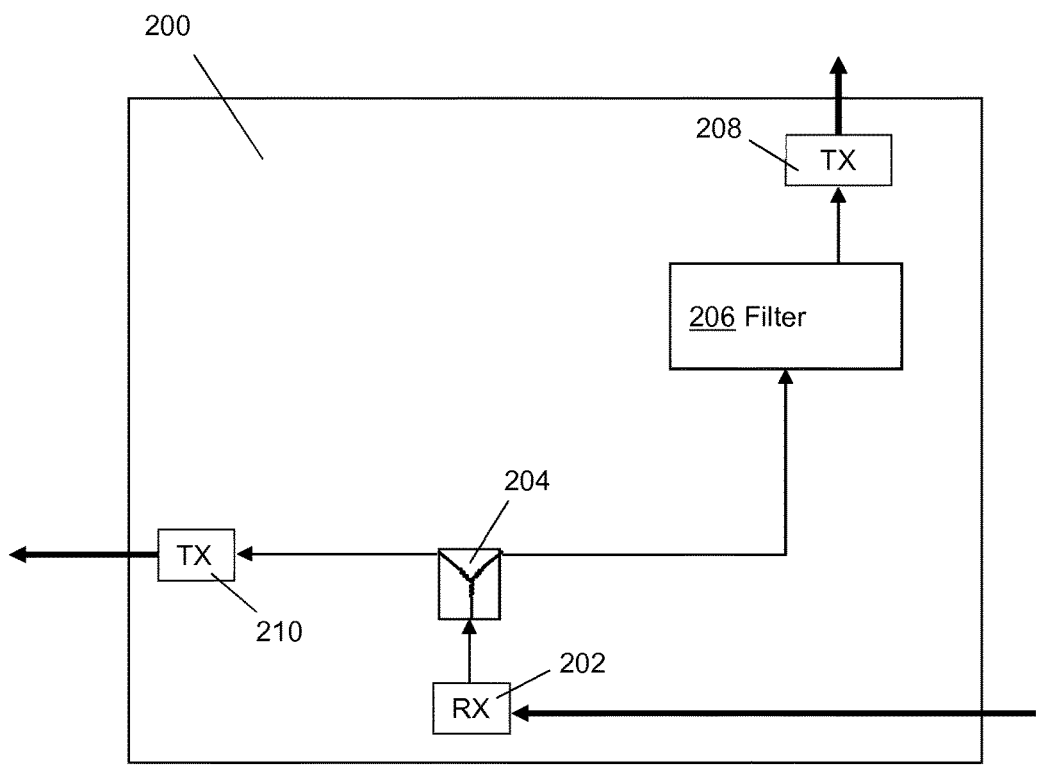
FIGS. 4 to 7 are schematic representations of communication signal demultiplexing apparatus according to embodiments of the invention.

An embodiment of the invention provides communication signal demultiplexing apparatus 200, as illustrated in FIG. 4. The communication signal demultiplexing apparatus comprises an optical receiver 202, signal splitting apparatus 204, second electrical filter apparatus 206, a first optical transmitter 208 and a second optical transmitter 210.

The optical receiver 202 is configured to receive an optical communication signal carrying a representation of a combined electrical communication signal and to convert the optical communication signal into the combined electrical communication signal. The combined electrical communication signal comprises an electrical digital communication signal having a frequency spectrum and an electrical analog radio signal having a carrier frequency.

The signal splitting apparatus 204 is configured to power split the combined electrical communication signal into first and second parts.

The second electrical filter apparatus 206 comprises a low-pass filter having a cut-off frequency lower than the carrier frequency of the electrical analog radio signal. The low-pass filter cut-off frequency is the 3 dB cut-off frequency. The second electrical filter apparatus is configured to receive the first part of the combined electrical communication signal and to apply the low-pass filter to the combined electrical communication signal. By low-pass filtering the combined electrical communication signal frequencies corresponding to the electrical analog radio signal are removed and the electrical digital communication signal is therefore obtained.

The first optical transmitter 208 is configured to convert the electrical digital communication signal into a corresponding optical digital communication signal. The second optical transmitter 210 is configured to receive the second part of the combined electrical communication signal and to convert said second part into a corresponding optical communication signal. The optical communication signal can be transmitted to a radio antenna, to provide the electrical analog radio signal to the radio antenna since radio antennae are very selective on the radio frequency spectrum for which they are configured to operate and include filtering stages that will remove the electrical digital communication signal frequencies from the received combined electrical communication signal.

Figure 5:
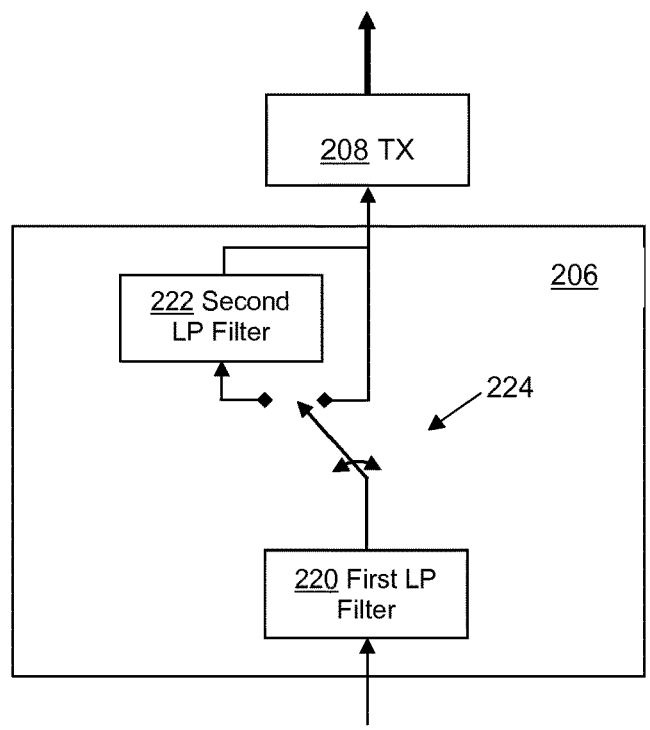

FIG. 5 illustrates part of a communication signal demultiplexing apparatus according to the present invention; the rest of the communication signal demultiplexing apparatus is the same as shown in FIG. 4. In one embodiment, the second electrical filter apparatus 206 comprises a filter cascade comprising a first low-pass filter 220, a second low-pass filter 222 and a switch 224.

The first low-pass filter has a first cut-off frequency, and the second low-pass filter has a second cut-off frequency, lower than the first cut-off frequency. The switch has a first state in which an output of the first low-pass filter 120 by-passes the second low-pass filter 122 and a second state in which the output of the first low-pass filter is coupled to an input of the second low-pass filter. The switch is configurable to be set to the first state when a first lobe of the frequency spectrum of the electrical digital communication signal is lower than the first cut-off frequency and is configurable to be set to the second state when the first lobe of the frequency spectrum of the electrical digital communication signal is lower than the second cut-off frequency.

In another embodiment, the analog radio signal is a 3GPP communication signal having a carrier frequency of at least 1 GHz and the digital communication signal is a Gigabit Ethernet, GbE, communication signal. In this embodiment, the digital communication signal can be a 1 GbE signal or a 10 GbE signal. The first low-pass filter 120 has a 3 dB cut-off frequency of at least 9 GHz, for example 9 GHz or 10 GHz, and the second low-pass filter has a 3 dB cut-off frequency of 1 GHz. The switch 124 is configurable to be set to the first state when the digital communication signal is a 10 GbE signal and to be set to the second state when the digital communication signal is a 1 GbE signal. With the switch 124 set in the first state, frequencies higher than the first low-pass filter cut-off frequency, for example 9 GHz or 10 GHz, are removed from the first part of the combined electrical communication signal, so for example the second filtering apparatus removes a 5G 3GPP radio signal in the high bands transmitted alongside a 10 GbE signal, and so obtains the 10 GbE signal. With the switch 124 set in the second state, frequencies higher than the second low-pass filter cut-off frequency, 1 GHz, are also removed, so for example the second filtering apparatus removes a 5G 3GPP radio signal in the mid bands transmitted alongside a 1 GbE signal, to obtain the 1 GbE signal.

Figure 6:
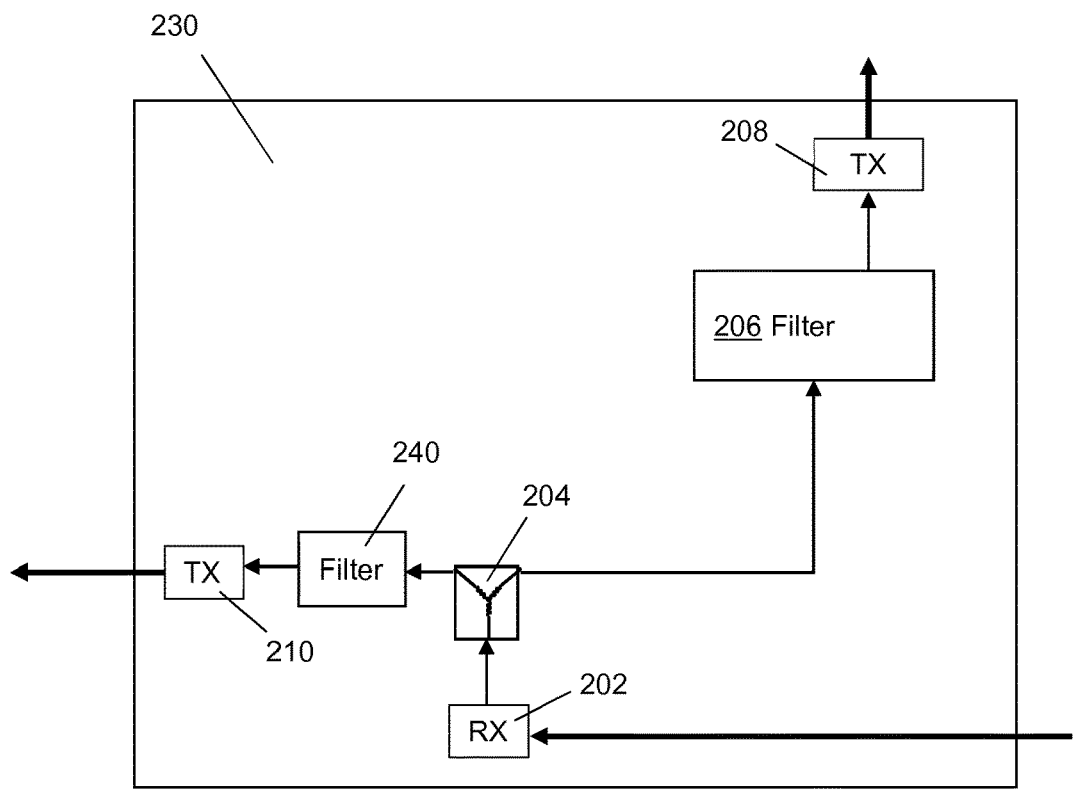

An embodiment of the invention provides communication signal demultiplexing apparatus 230, as illustrated in FIG. 6. The communication signal demultiplexing apparatus 230 of this embodiment additionally comprises third electrical filter apparatus 240.

The third electrical filter apparatus 240 comprises a high-pass filter having a cut-off frequency lower than the carrier frequency of the electrical analog radio signal. The high-pass filter cut-off frequency is the 3 dB cut-off frequency. The third electrical filter apparatus is configured to receive the second part of the combined electrical digital communication signal and to apply the high-pass filter to said second part of the combined electrical digital communication signal. Frequencies corresponding to the electrical digital communication signal are thereby removed, and the electrical analog radio signal is obtained.

The second optical transmitter 210 is configured to receive the electrical analog radio signal and to convert the electrical analog radio signal into a corresponding optical analog radio signal. The optical communication signal can then be transmitted to a radio antenna, to provide the electrical analog radio signal to the radio antenna. Removing the electrical digital communication signal prevents interference between the electrical analog radio signal and the electrical digital communication signal in the second optical transmitter.

Figure 7:
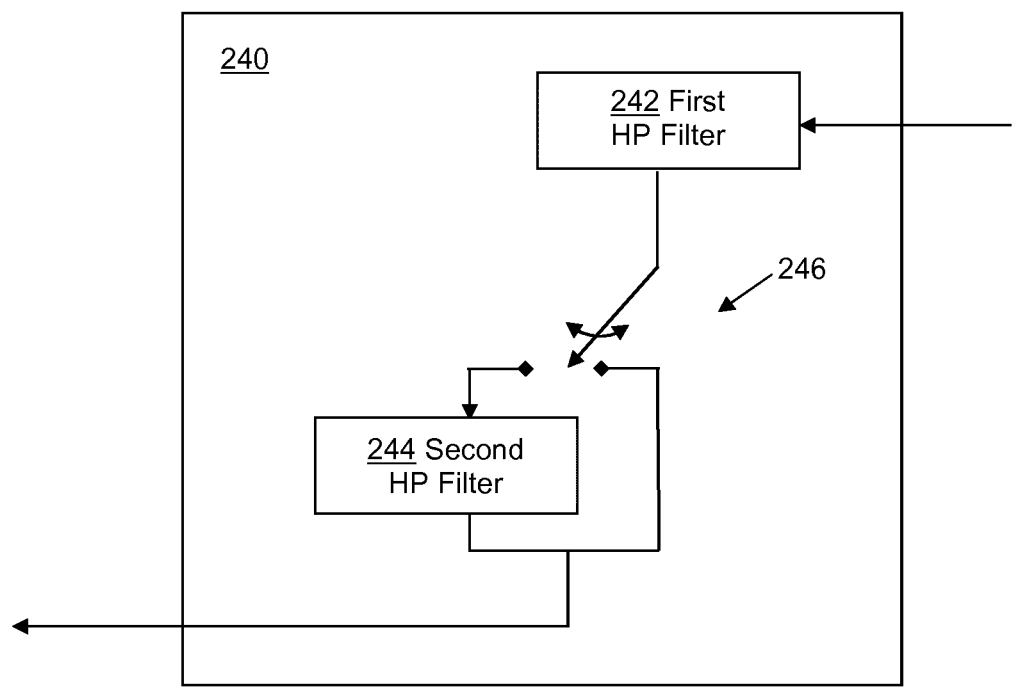

FIG. 7 illustrates part of a communication signal demultiplexing apparatus according to the present invention; the rest of the communication signal demultiplexing apparatus is the same as shown in FIG. 6. In one embodiment, the third electrical filter apparatus 240 comprises a filter cascade comprising a first high-pass filter 242, a second high-pass filter 244 and a switch 246.

The first high-pass filter 242 has a first cut-off frequency and the second high-pass filter 244 has a second cut-off frequency higher than the first cut-off frequency. The switch 246 has a first state in which an output of the first high-pass filter by-passes the second high-pass filter and a second state in which the output of the first high-pass filter is coupled to an input of the second high-pass filter. The switch is configurable to be set to the first state when the electrical digital communication signal frequency spectrum occupies a frequency range lower than the first cut-off frequency and is configurable to be set to the second state when the electrical digital communication signal frequency spectrum occupies a frequency range higher than the first cut-off frequency and lower than the second cut-off frequency.

In another embodiment, the analog radio signal is a 3GPP communication signal having a carrier frequency of at least 1 GHz and the digital communication signal is a Gigabit Ethernet, GbE, communication signal. In this embodiment, the digital communication signal can be a 1 GbE signal or a 10 GbE signal. The first high-pass filter 120 has a 3 dB cut-off frequency of 1 GHz and the second high-pass filter has a 3 dB cut-off frequency of at least 9 GHz, for example 9 GHz or 10 GHz. The switch 246 is configurable to be set to the first state when the digital communication signal is a 1 GbE signal and to be set to the second state when the digital communication signal is a 10 GbE signal. With the switch 124 set in the first state, frequencies lower than the first high-pass filter cut-off frequency, 1 GHz, are removed from the second part of the combined electrical communication signal. So, for example the third filtering apparatus removes a 1 GbE signal transmitted alongside a 5G 3GPP radio signal in the mid or high bands, and so obtains the 5G radio signal. With the switch 246 set in the second state, frequencies lower than the second high-pass filter cut-off frequency, 9 GHz or 10 GHz, are also removed. So, for example the third filtering apparatus removes a 10 GbE signal transmitted alongside a 5G 3GPP radio signal in the high bands, and so obtains the 5G radio signal.

Corresponding embodiments apply equally to the communication network node and to the methods described below.

Figure 8:
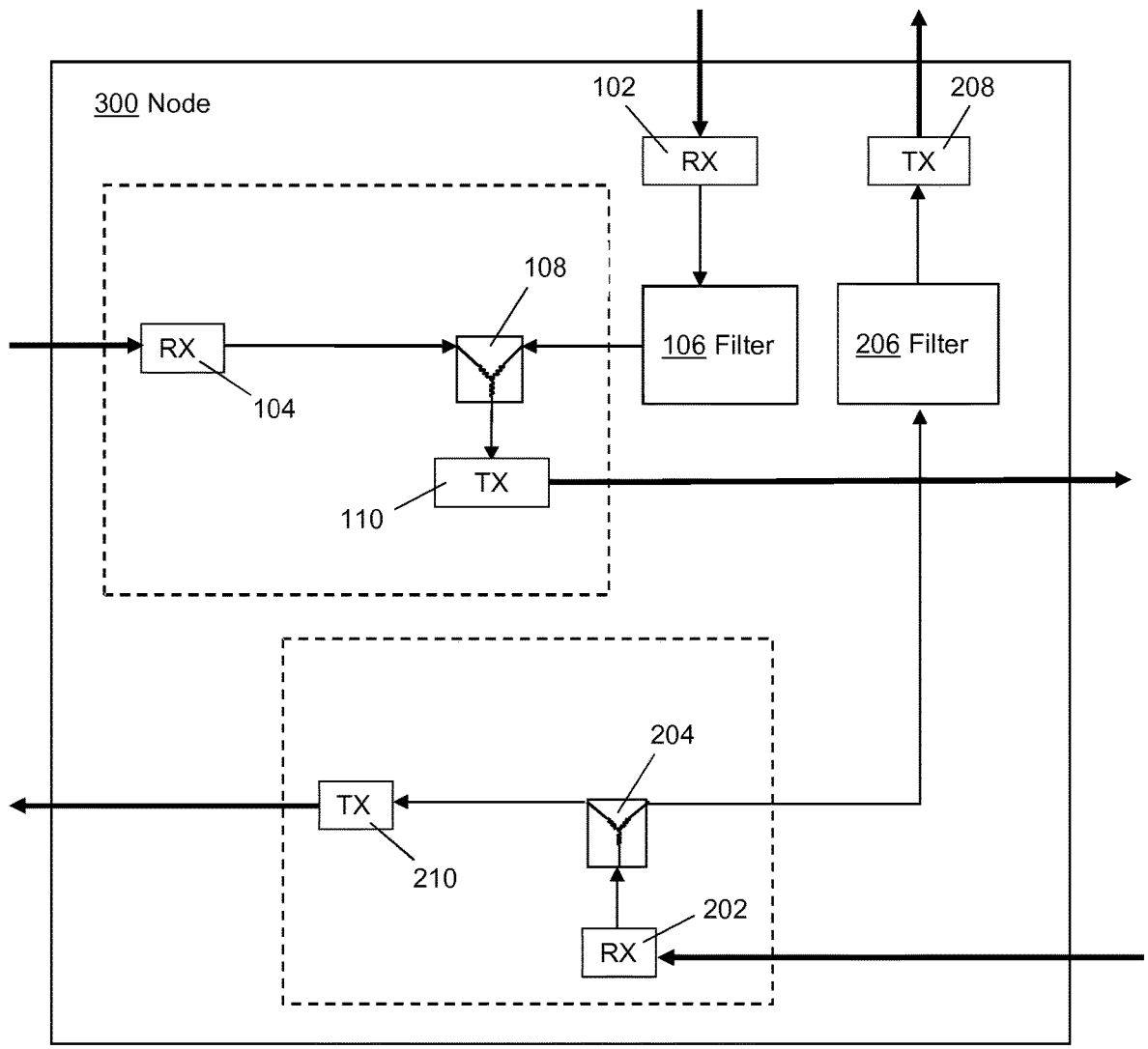
FIGS. 8 to 11 are schematic representations of communication network nodes according to embodiments of the invention.

An embodiment of the invention provides a communication network node 300, as illustrated in FIG. 8. The node 300 comprises communication signal multiplexing apparatus 100, 130 as described above with reference to any of FIGS. 1 to 3 and communication signal demultiplexing apparatus 200 as described above with reference to FIG. 4 or 5.

Figure 9:
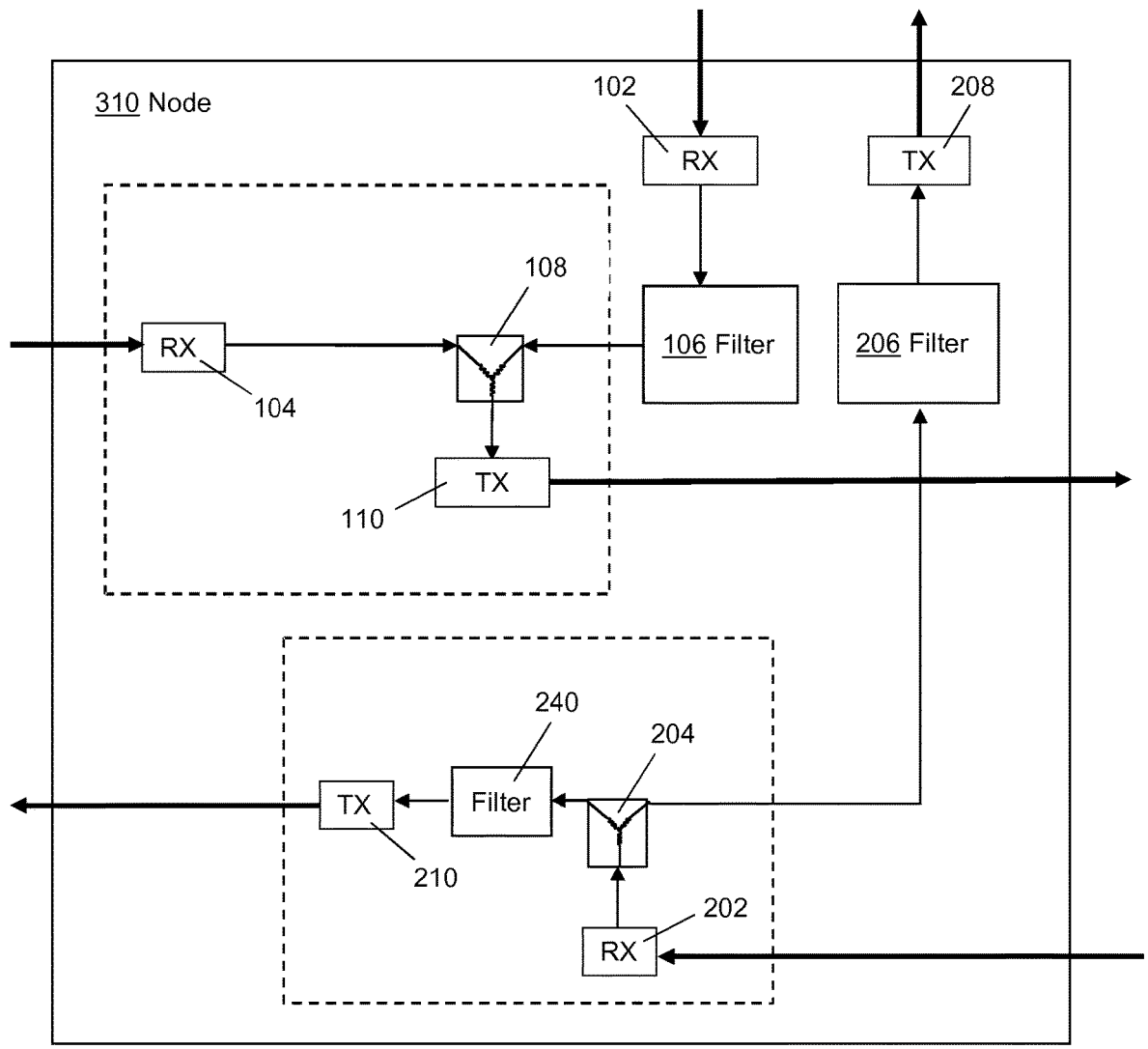

An embodiment of the invention provides a communication network node 310, as illustrated in FIG. 9. The node 300 comprises communication signal multiplexing apparatus 100, 130 as described above with reference to any of FIGS. 1 to 3 and communication signal demultiplexing apparatus 230 as described above with reference to FIG. 6 or 7.

Figure 10:
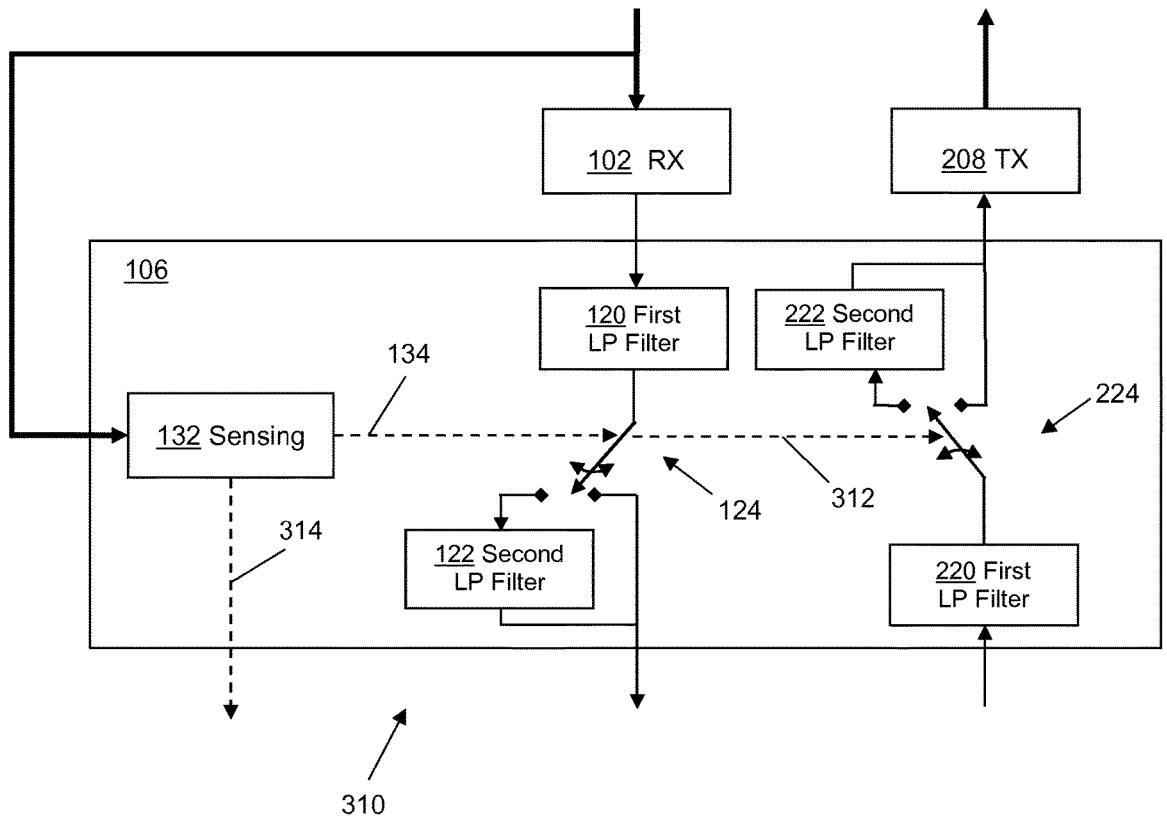

FIG. 10 illustrates part of a communication network node according to an embodiment of the invention; the rest of the node is the same as shown in FIG. 9. In this embodiment, the sensing apparatus 132 is configured to generate a second control signal 312 configured to cause the switch 224 of the second electrical filter 206 apparatus to be set to the first state or the second state depending on the frequency range occupied by the electrical digital communication signal frequency spectrum.

The sensing apparatus 132 is also configured to generate a third control signal 314 configured to cause the switch 246 of the third electrical filter apparatus 240 to be set to the first state or the second state depending on the frequency range occupied by the electrical digital communication signal frequency spectrum.

Figure 11:
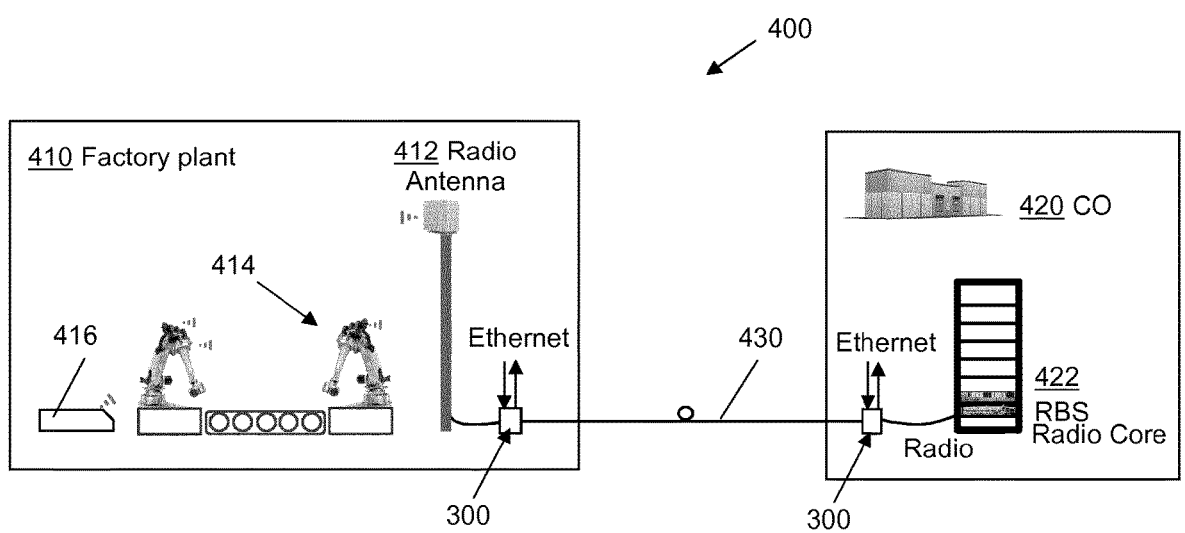

FIG. 11 illustrates an application of the communication network node 300, for communication of a radio traffic flow between a radio antenna 412, located in a first site 410, and a radio system 422 (operating baseband processing and core functionalities) located in a second site 420; the sites are connected by an optical fiber link 430. For example, the radio system 422 may be located in the central office, CO, 420 of a telecom operator and the radio antenna 412 may be located in a factory 410. The factory contains fixed and mobile robots 414 connected to the cellular network via the radio antenna 412, giving the option to have all or part of the robot control performed on a cloud platform.

A communication network node 300 is located at each site, connected by the optical fiber link, to enable the simultaneous transmission, without mutual interference, of radio traffic and Ethernet traffic on the fiber link between the two locations over a geographical distance of several km. At the factory side, the electrical analog radio signals are obtained and directly used to feed the indoor radio antenna 412 and the Ethernet signal are sent to an Ethernet switch, to be used for other (non-cellular) connectivity needs of the factory (including connecting Wi-Fi hot spots). The application of the communication network node 300 to connect a factory with the central office of a telecom operator may enable deployment of an indoor, dedicated, cellular network in the factory and specifically a 5G network where low edge-to-edge latency is a key requirement.

A mature factory play may have up to 1000 moving parts, plus many more devices and sensors. Data traffic within a factory may no longer be supportable by existing wired internal networks, largely based on legacy Ethernet networks, and current plant networks can have bottlenecks. There are three potential options to solve the problem of insufficient network capacity with a factory: add a second wired network in support of the legacy network, possible but not easy to integrate the networks; complete re-cabling of the plant, for example using optical fibres; change to a wireless network using a cellular technology in a licensed spectrum.

The third option is preferred because it reduces the cost for connection of various elements of a production line, reducing the commissioning cost for plant construction or upgrade. It also facilitates using a plethora of new wireless sensors, which are easy to attach onto robots 414 even in legacy plants. For example, pressure, temperature, and vibration (IMU) sensors may be deployed and correlating data from these sensors may enhance monitoring of factory plant. The third option also facilitates connecting new robots and moving objects without complex and inflexible cabling; cabling is easily subject to attrition especially in fast moving robots. It enables deployment of Automated Guided Vehicles 416 that will replace conveyor belts in future and it is more easily scalable with the number of "objects" that are and will be connected in a plant than a wired network.

Figure 12:
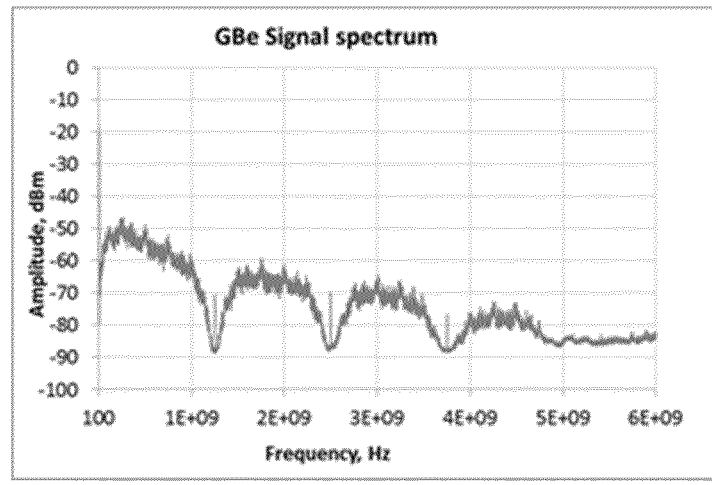
FIG. 12 shows the electrical spectrum of a 1 GbE signal before low-pass filtering.
Figure 13:
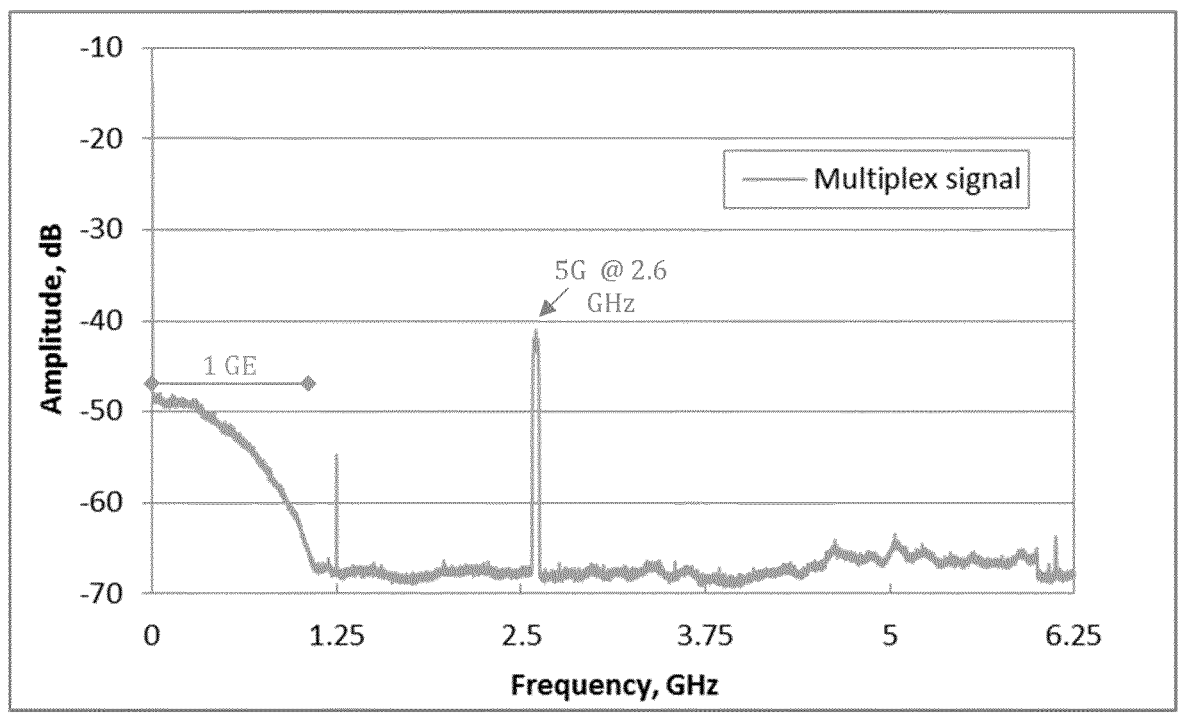
FIG. 13 shows the electrical spectrum of a 1 GbE signal multiplexed with a 5G radio signal at a carrier frequency of 2.6 GHz, formed with communication signal multiplexing apparatus according to an embodiment of the invention.

As can be seen in FIG. 12 the frequency spectrum of a 1 GbE signal has a number of amplitude peaks or lobes. The majority of the frequency spectrum of the first lobe, i.e. the lobe occupying the lowest frequencies, lies below 1 GHz (1E+09 Hz). Applying a low-pass filter having a 3 dB cut-off frequency of 1 GHz will reject any part of the 1 GbE frequency spectrum at frequencies higher than the cut-off frequency, making those frequencies available to host an analog radio signal, such as a Mid Band 5G radio signal at 2.6 GHz, as illustrated in FIG. 13.

Figure 14:
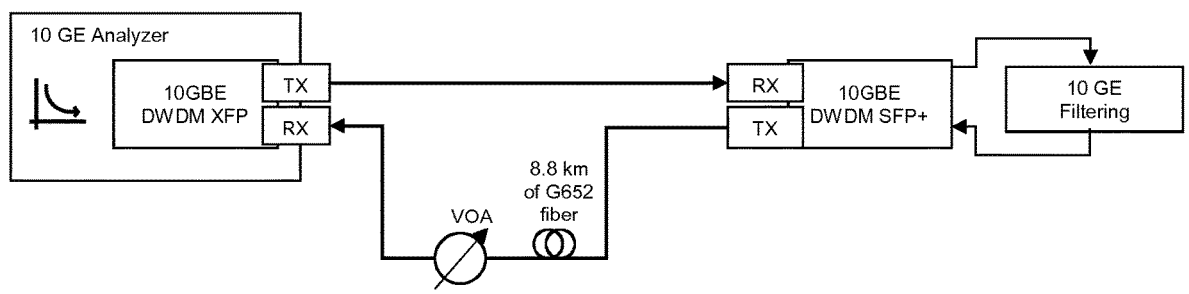
FIG. 14 is a schematic representation of an experimental test apparatus used to evaluate the effects of low-pass filtering on a GbE signal.

An experimental evaluation of the effects of low-pass filtering a 10 GbE signal using a low-pass filter having a 3 dB cut-off frequency of between 8 GHz and 10 GHz was carried out using the apparatus illustrated in FIG. 14.

A 10 GbE Analyzer transmits and receives optical signals at 1550 nm through an optical transceiver module (10 GBE DWDM XPF). An 8.8 km length of G625 optical fibre (single mode standard optical fibre) was used to transmit the optical signals. An SFP+ optical transceiver (10 GBE DWDM SFP) was used to perform optical to electrical and electrical to optical conversion.

A first test was performed without a low-pass filter (10 GE Filtering), by closing the optical fiber in loopback. A second test was performed including the low-pass filter (10 GE Filtering) for three different 3 dB cut-off frequencies: 10 GHz, 9 GHz, and 8 GHZ.

A Variable Optical Attenuator (VOA) was used to adjust the optical power level (Pin) at the input of the XFP.

Figure 15:
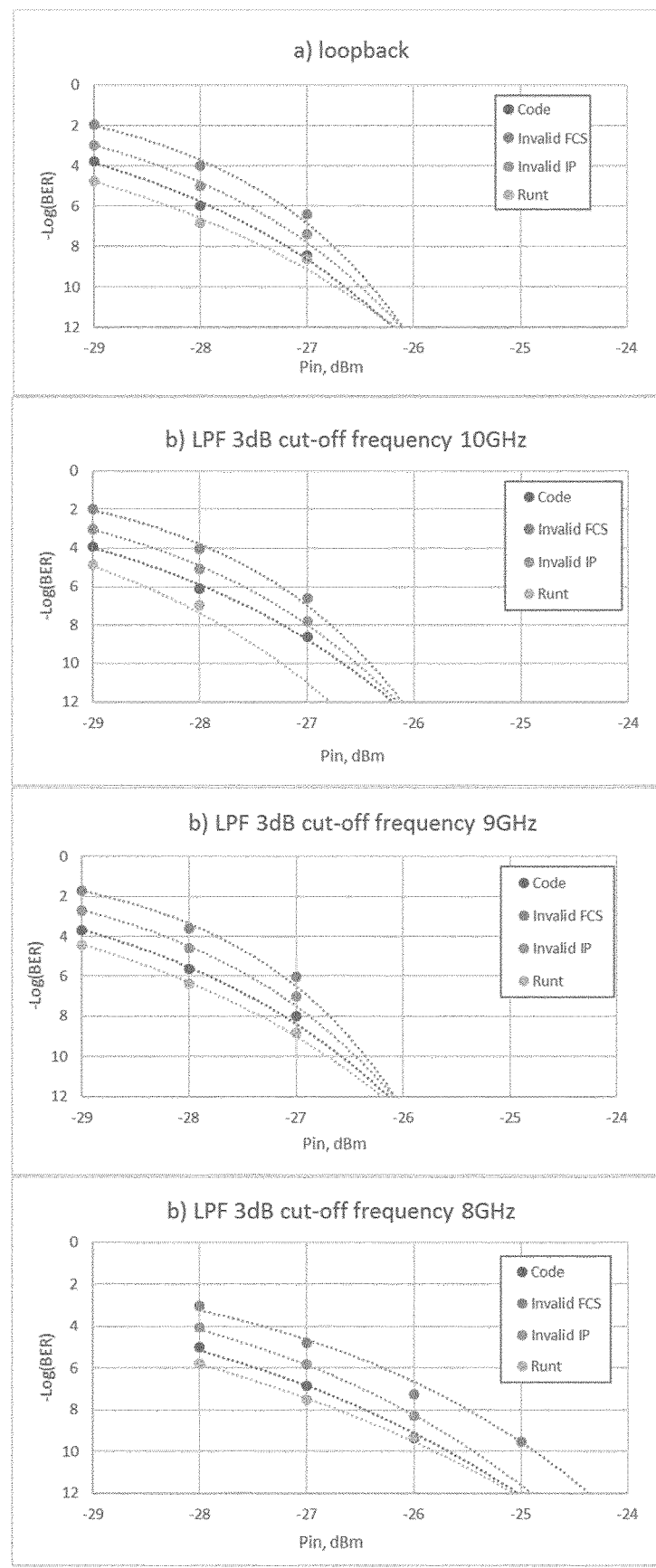
FIG. 15 shows bit error rate, BER, as a function of input power, Pin, for the following configurations of the apparatus of FIG. 13: a) loopback; b) low-pass filter 3 dB cut-off frequency 10 GHz; c) low-pass filter 3 dB cut-off frequency 9 GHz; d) low-pass filter 3 dB cut-off frequency 8 GHz.

For each test, four Ethernet parameters (Code, Invalid FCS, Invalid IP, Runt) were monitored and their respective Bit error rate (BER) as a function of Pin (dBm) are shown in FIG. 15. If the BER of a parameter is below 10E-12, then we consider that the parameter has not been impaired by the low-pass filtering.

FIG. 15a shows the measurements for the loopback configuration of test 1. FIG. 15b shows the measurements for a low-pass filter having a 10 GHz 3 dB cut-off frequency, FIG. 15c shows the measurements for a low-pass filter having a 9 GHz 3 dB cut-off frequency and FIG. 15d shows the measurements for a low-pass filter having a 8 GHz 3 dB cut-off frequency.

As can be seen from FIG. 15, the performance of a 10 GbE signal, filtered by the low-pass filter, are not affected by the low-pass filtering if the cut-off frequency is greater 9 GHz.

Considering that 10 GbE receivers are typically built with filters having a 3 dB cut-off frequency of 10 GHz, the action of the low-pass filter for shaping the Ethernet signal does not degrade its performances.

Figure 16:
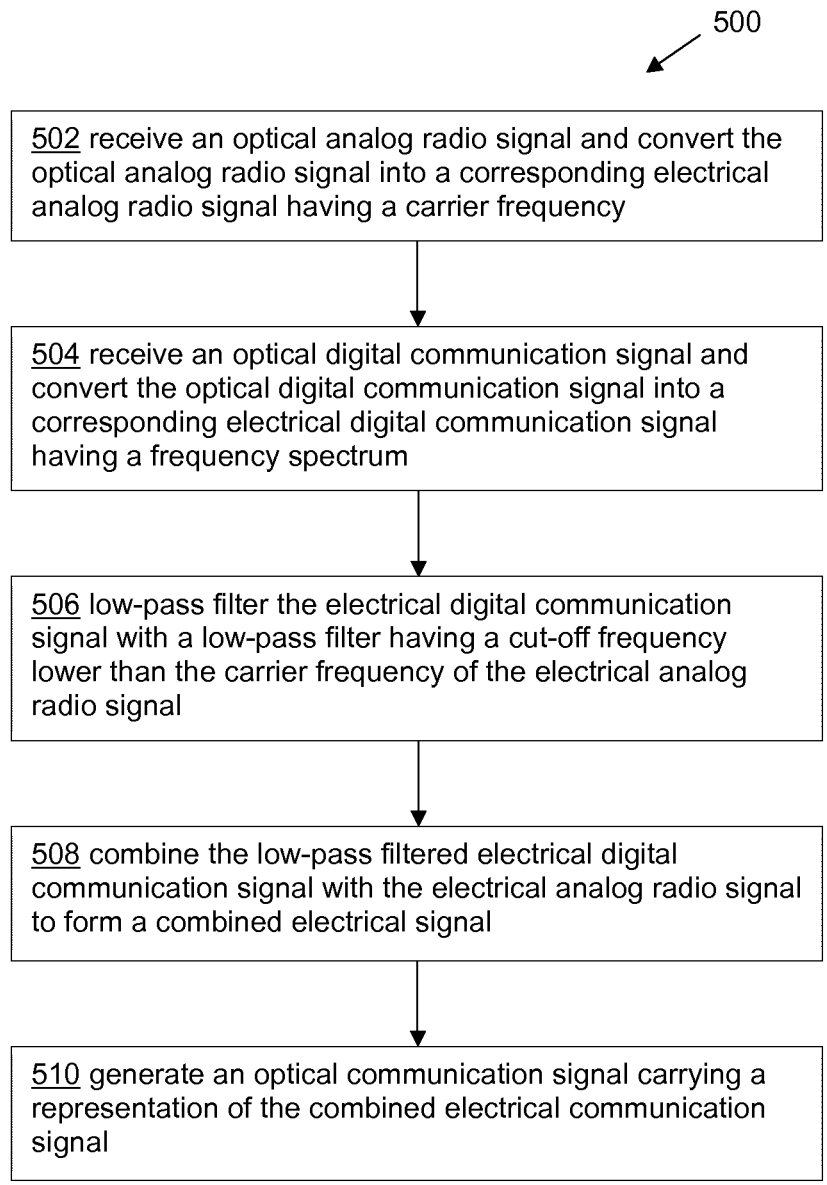
FIG. 16 illustrates steps of a method according to an embodiment of the invention of multiplexing communication signals.

An embodiment of the invention provides a method 500 of multiplexing communication signals having steps as illustrated in FIG. 16. The method comprises steps of receiving 502 an optical analog radio signal and receiving 504 an optical digital communication signal. The optical analog radio signal is converted into a corresponding electrical analog radio signal having a carrier frequency and the optical digital communication signal is converted into a corresponding electrical digital communication signal having a frequency spectrum.

The method comprises a step of low-pass filtering 506 the electrical digital communication signal with a low-pass filter. The low-pass filter has a cut-off frequency that is lower than the carrier frequency of the electrical analog radio signal. The low-pass filtered electrical digital communication signal is then combined 508 with the electrical analog radio signal to form a combined electrical signal and an optical communication signal carrying a representation of the combined electrical communication signal is generated 510.

In an embodiment, the step of low-pass filtering 506 the electrical digital communication signal comprises low-pass filtering with a first low-pass filter or with a filter cascade, comprising the first low-pass filter followed by a second low-pass filter. The first low-pass filter has a first cut-off frequency and the second low-pass filter has a second cut-off frequency lower than the first cut-off frequency. The first low-pass filter is used when the first lobe of the frequency spectrum of the electrical digital communication signal is lower than the first cut-off frequency. The combination of the first low-pass filter followed by the second low-pass filter is used when the first lobe of the frequency spectrum of the electrical digital communication signal is lower than the second cut-off frequency.

In an embodiment, the analog radio signal is a 3GPP communication signal having a carrier frequency of at least 1 GHz. The digital communication signal is a GbE communication signal.

In an embodiment, the digital communication signal is either a 1 GbE communication signal or a 10 GbE communication signal. The step of low-pass filtering 506 comprises low-pass filtering the electrical digital communication signal with a low-pass filter having cut-off frequency of at least 9 GHz when the digital communication signal is a 10 GbE communication signal. The step of low-pass filtering 506 comprises low-pass filtering the electrical digital communication signal with a low-pass filter having cut-off frequency of 1 GHz when the digital communication signal is a 1 GbE communication signal.

Figure 17:
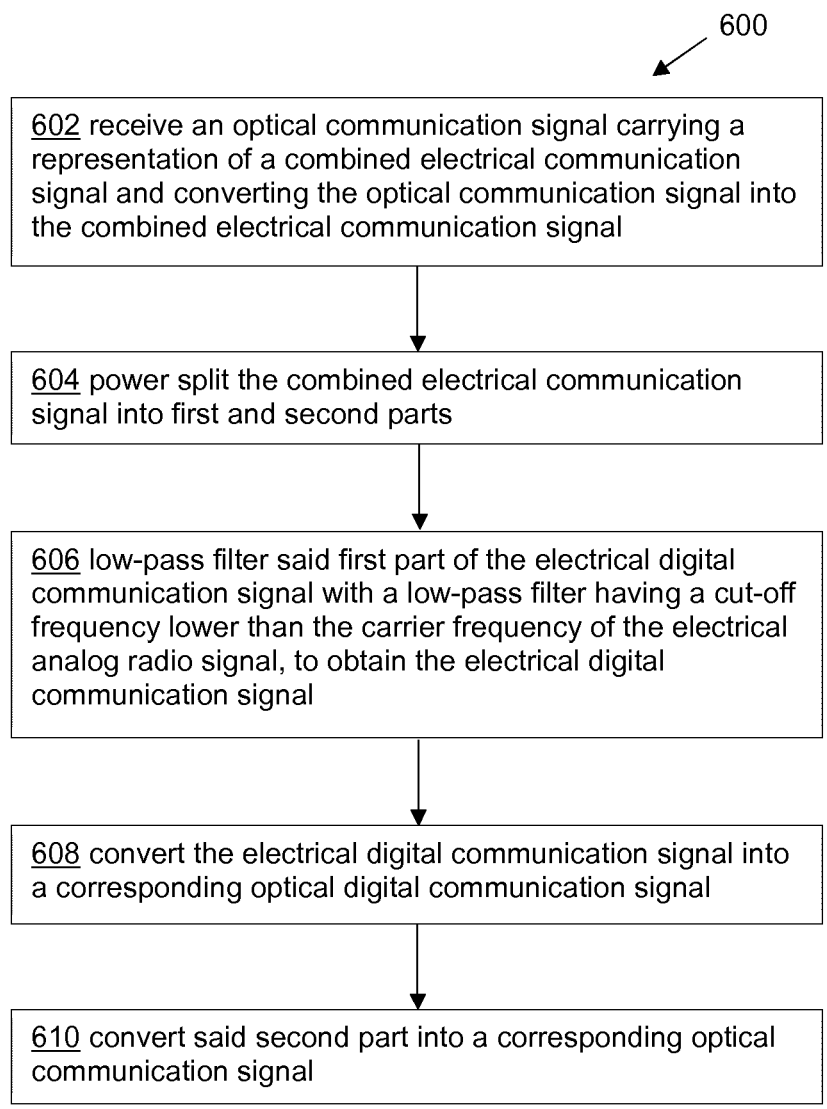
FIGS. 17 and 18 illustrate steps of methods according to embodiments of the invention of demultiplexing communication signals.

An embodiment of the invention provides a method 600 of demultiplexing communication signals having the steps illustrated in FIG. 17. The method comprises a step of receiving 602 an optical communication signal carrying a representation of a combined electrical communication signal. The combined electrical communication signal comprises an electrical digital communication signal having a frequency spectrum multiplexed with an electrical analog radio signal having a carrier frequency. The received optical communication signal is converted into the combined electrical communication signal.

The method comprises a step of power splitting 604 the combined electrical communication signal into first and second parts; each part comprises a replica of the combined electrical communication signal. The first part of the combined electrical digital communication signal is low-pass filtered with a low-pass filter having a cut-off frequency lower than the carrier frequency of the electrical analog radio signal. The electrical analog radio signal is therefore rejected by the low-pass filter and the electrical digital communication signal is obtained.

The method comprises steps of converting 608 the electrical digital communication signal into a corresponding optical digital communication signal and converting 610 the second part of the combined electrical communication signal into a corresponding optical communication signal, which therefore carries the multiplexed analog radio signal and digital communication signal.

Figure 18:
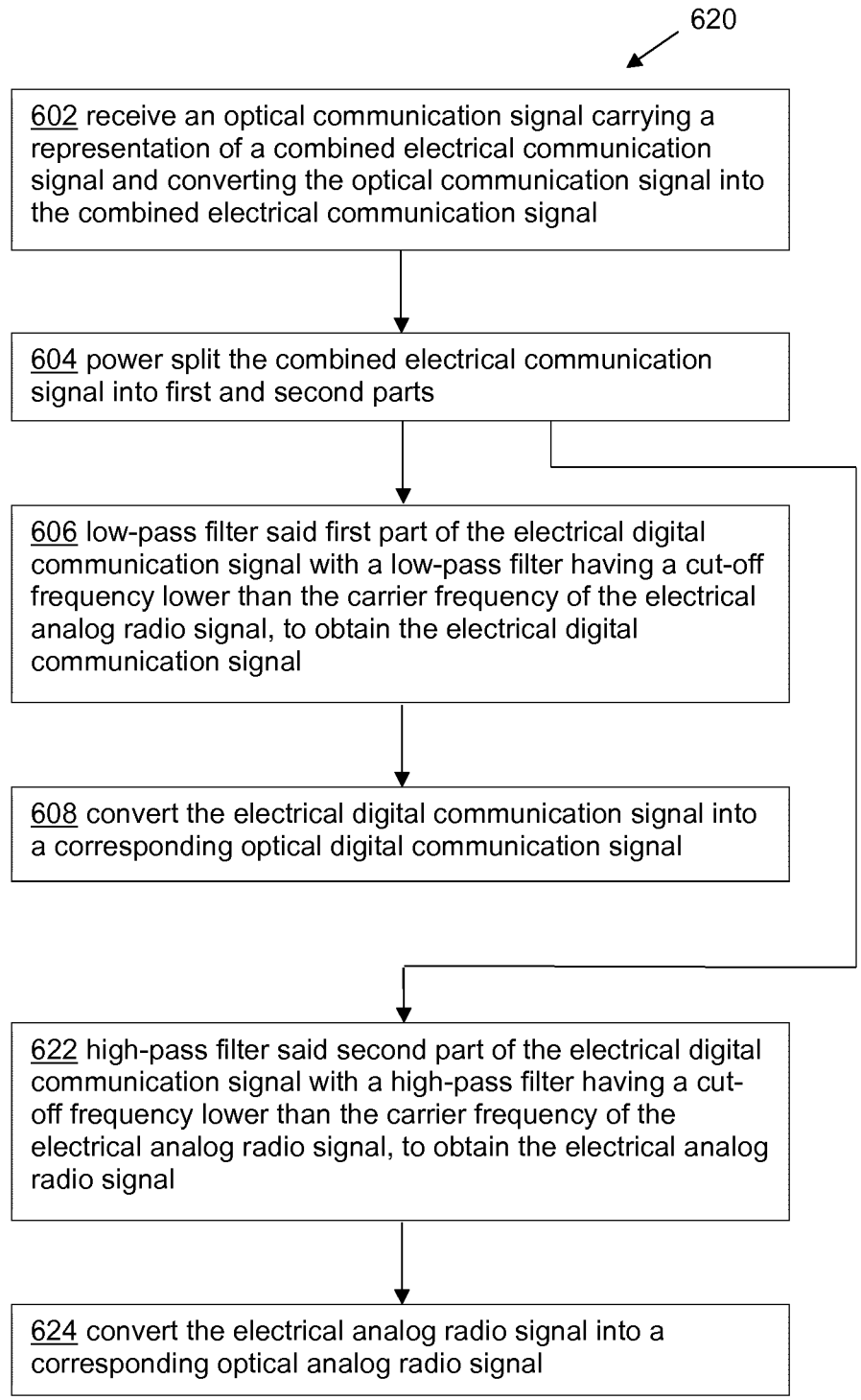

An embodiment of the invention provides a method 620 of demultiplexing communication signals having the steps illustrated in FIG. 18. In this embodiment, the second part of the electrical digital communication signal is high-pass filtered 622 with a high-pass filter having a cut-off frequency lower than the carrier frequency of the electrical analog radio signal. The electrical digital communication signal is thereby rejected and the electrical analog radio signal is obtained. The electrical analog radio signal is then converted 624 into a corresponding optical analog radio signal.

An embodiment of the invention provides a computer program comprising instructions which, when executed on at least one processor, cause the at least one processor to carry out the method of multiplexing communication signals, as described above.

An embodiment of the invention provides a carrier containing a computer program comprising instructions which, when executed on at least one processor, cause the at least one processor to carry out the method of multiplexing communication signals, as described above.

In an embodiment, the carrier is one of an electronic signal, optical signal, radio signal, or computer readable storage medium.

An embodiment of the invention provides a computer program comprising instructions which, when executed on at least one processor, cause the at least one processor to carry out the method of demultiplexing communication signals, as described above.

An embodiment of the invention provides a carrier containing a computer program comprising instructions which, when executed on at least one processor, cause the at least one processor to carry out the method of demultiplexing communication signals, as described above.

In an embodiment, the carrier is one of an electronic signal, optical signal, radio signal, or computer readable storage medium.

The invention claimed is:

1. A communication signal multiplexing apparatus comprising:
   a first optical receiver configured to receive an optical analog radio signal and to convert the optical analog radio signal into a corresponding electrical analog radio signal having a carrier frequency;
   a second optical receiver configured to receive an optical digital communication signal and to convert the optical digital communication signal into a corresponding electrical digital communication signal having a frequency spectrum;
   a first electrical filter apparatus comprising a low-pass filter having a cut-off frequency lower than the carrier frequency of the electrical analog radio signal, wherein the first electrical filter apparatus is configured to receive the electrical digital communication signal and to apply the low-pass filter to the electrical digital communication signal;
   signal combining apparatus configured to combine the low-pass filtered electrical digital communication signal with the electrical analog radio signal to form a combined electrical communication signal; and
   an optical transmitter configured to generate an optical communication signal carrying a representation of the combined electrical communication signal;
   wherein the first electrical filter apparatus comprises:
      a filter cascade comprising:
      a first low-pass filter having a first cut-off frequency;
      a second low-pass filter having a second cut-off frequency lower than the first cut-off frequency; and
      a switch having a first state in which an output of the first low-pass filter by-passes the second low-pass filter and a second state in which the output of the first low-pass filter is coupled to an input of the second low-pass filter, wherein the switch is configurable to be set to the first state when a first lobe of the frequency spectrum of the electrical digital communication signal is lower than the first cut-off frequency and is configurable to be set to the second state when the first lobe of the frequency spectrum of the electrical digital communication signal is lower than the second cut-off frequency.

2. The communication signal multiplexing apparatus as claimed in claim 1, further comprising a sensing apparatus configured to:
   receive a replica of the optical digital communication signal;
   convert the replica of the optical digital communication signal into a corresponding electrical digital communication signal having a frequency spectrum;
   determine the frequency range occupied by the frequency spectrum; and generate a first control signal configured to cause the switch to be set to the first state or the second state depending on the frequency range occupied by the frequency spectrum.

3. A communication signal demultiplexing apparatus comprising:
an optical receiver configured to receive an optical communication signal carrying a representation of a combined electrical communication signal and configured to convert the optical communication signal into the combined electrical communication signal, the combined electrical communication signal comprising an electrical digital communication signal having a frequency spectrum and an electrical analog radio signal having a carrier frequency;
a signal splitting apparatus configured to power split the combined electrical communication signal into first and second parts;
a second electrical filter apparatus comprising a low-pass filter having a cut-off frequency lower than the carrier frequency of the electrical analog radio signal, wherein the second electrical filter apparatus is configured to receive a first part of the combined electrical communication signal and to apply the low-pass filter to the combined electrical communication signal to obtain the electrical digital communication signal;
a first optical transmitter configured to convert the electrical digital communication signal into a corresponding optical digital communication signal; and
a second optical transmitter configured to receive a second part of the combined electrical communication signal and to convert said second part into a corresponding optical communication signal;
wherein the second electrical filter apparatus comprises:
a filter cascade comprising:
a first low-pass filter having a first cut-off frequency;
a second low-pass filter having a second cut-off frequency lower than the first cut-off frequency; and
a switch having a first state in which an output of the first low-pass filter by-passes the second low-pass filter and a second state in which the output of the first low-pass filter is coupled to an input of the second low-pass filter, wherein the switch is configurable to be set to the first state when a first lobe of the frequency spectrum of the electrical digital communication signal is lower than the first cut-off frequency and is configurable to be set to the second state when the first lobe of the frequency spectrum of the electrical digital communication signal is lower than the second cut-off frequency.

4. A communication signal demultiplexing apparatus comprising:
an optical receiver configured to receive an optical communication signal carrying a representation of a combined electrical communication signal and configured to convert the optical communication signal into the combined electrical communication signal, the combined electrical communication signal comprising an electrical digital communication signal having a frequency spectrum and an electrical analog radio signal having a carrier frequency;
a signal splitting apparatus configured to power split the combined electrical communication signal into first and second parts;
a second electrical filter apparatus comprising a low-pass filter having a cut-off frequency lower than the carrier frequency of the electrical analog radio signal, wherein the second electrical filter apparatus is configured to receive a first part of the combined electrical communication signal and to apply the low-pass filter to the combined electrical communication signal to obtain the electrical digital communication signal;
a first optical transmitter configured to convert the electrical digital communication signal into a corresponding optical digital communication signal; and
a second optical transmitter configured to receive a second part of the combined electrical communication signal and to convert said second part into a corresponding optical communication signal;
wherein the communication signal demultiplexing apparatus further comprises a third electrical filter apparatus comprising a high-pass filter having a cut-off frequency lower than the carrier frequency of the electrical analog radio signal, wherein the third electrical filter apparatus is configured to receive said second part of the combined electrical digital communication signal and to apply the high-pass filter to said second part of the combined electrical digital communication signal to obtain the electrical analog radio signal, and wherein the second optical transmitter is configured to receive the electrical analog radio signal and to convert the electrical analog radio signal into a corresponding optical analog radio signal; and
wherein the third electrical filter apparatus comprises:
a filter cascade comprising:
a first high-pass filter having a first cut-off frequency;
a second high-pass filter having a second cut-off frequency higher than the first cut-off frequency; and
a switch having a first state in which an output of the first high-pass filter by-passes the second high-pass filter and a second state in which the output of the first high-pass filter is coupled to an input of the second high-pass filter, wherein the switch is configurable to be set to the first state when the electrical digital communication signal frequency spectrum occupies a frequency range lower than the first cut-off frequency and is configurable to be set to the second state when the electrical digital communication signal frequency spectrum occupies a frequency range higher than the first cut-off frequency and lower than the second cut-off frequency.

5. A method of multiplexing communication signals, the method comprising:
receiving an optical analog radio signal and converting the optical analog radio signal into a corresponding electrical analog radio signal having a carrier frequency;
receiving an optical digital communication signal and converting the optical digital communication signal into a corresponding electrical digital communication signal having a frequency spectrum;
low-pass filtering the electrical digital communication signal with a low-pass filter having a cut-off frequency lower than the carrier frequency of the electrical analog radio signal;
combining the low-pass filtered electrical digital communication signal with the electrical analog radio signal to form a combined electrical communication signal; and
generating an optical communication signal carrying a representation of the combined electrical communication signal;
wherein the electrical digital communication signal is low-pass filtered with a first low-pass filter having a first cut-off frequency or with the first low-pass filter followed by a second low-pass filter having a second cut-off frequency lower than the first cut-off frequency, and wherein the first low-pass filter is used when a first lobe of the frequency spectrum of the electrical digital communication signal is lower than the first cut-off frequency and the combination of the first low-pass filter followed by the second low-pass filter is used when the first lobe of the frequency spectrum of the electrical digital communication signal is lower than the second cut-off frequency.

* * * * *